(12) United States Patent
Schreck et al.

(10) Patent No.: US 12,351,297 B2
(45) Date of Patent: Jul. 8, 2025

(54) AIRCRAFT STRUCTURE COMPONENT FOR LAMINAR FLOW

(71) Applicants: Airbus Operations GmbH, Hamburg (DE); AIRBUS OPERATIONS LIMITED, Bristol (GB)

(72) Inventors: Tobias Schreck, Hamburg (DE); Peter Rosenecker, Hamburg (DE); Tim Chant, Bristol (GB)

(73) Assignees: AIRBUS OPERATIONS GMBH, Hamburg (DE); AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/391,208

(22) Filed: Dec. 20, 2023

(65) Prior Publication Data

US 2024/0208641 A1 Jun. 27, 2024

(30) Foreign Application Priority Data

Dec. 21, 2022 (EP) ...................................... 22215336

(51) Int. Cl.
*B64C 21/10* (2006.01)
(52) U.S. Cl.
CPC .................................... *B64C 21/10* (2013.01)
(58) Field of Classification Search
CPC B64C 21/10; B64C 23/00; B64C 3/26; B64C 11/205; B64C 27/023
See application file for complete search history.

(56) References Cited

U.S. PATENT DOCUMENTS

2017/0327245 A1 11/2017 Salisbury
2018/0134374 A1\* 5/2018 Schlipf .................. B05B 12/28

FOREIGN PATENT DOCUMENTS

EP 1469198 A1 \* 10/2004 ............. B64C 21/10
EP 3882131 A1 9/2021
WO 2015198093 A1 12/2015

OTHER PUBLICATIONS

Extended European Search Report for EP22215336.3, mailed Jun. 5, 2023, 5 pages.

\* cited by examiner

*Primary Examiner* — Nicholas McFall
*Assistant Examiner* — Eric Acosta
(74) *Attorney, Agent, or Firm* — Nixon & Vanderhye P.C.

(57) ABSTRACT

An aircraft structure component (1) for laminar flow including an outer skin (3) having an aerodynamic surface (5), wherein the aerodynamic surface (5) has a leading edge portion (7) and a downstream portion (11) adjacently downstream from the leading edge portion (7), wherein the downstream portion (11) of the aerodynamic surface (5) comprises a paint layer (13) or a foil layer that is not present in the leading edge portion (7), so that a border line (15) is formed between the leading edge portion (7) and the downstream portion (11) by the beginning paint layer (13) or foil layer, and wherein the outer skin (3) comprises an attachment surface (17) to which the paint layer (13) or the foil layer is attached.

20 Claims, 2 Drawing Sheets

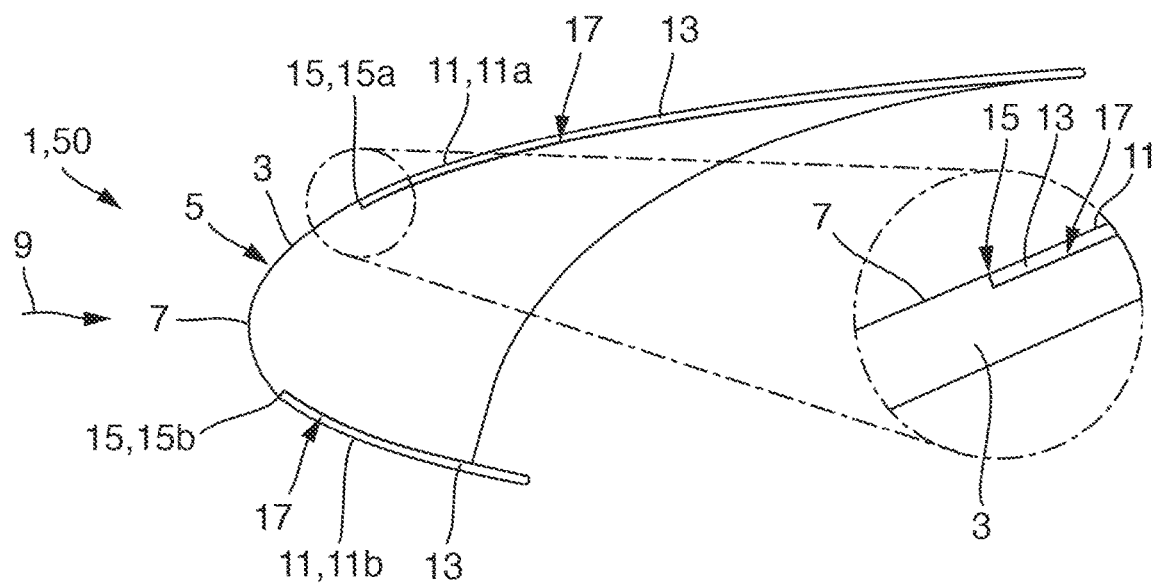
Fig. 2
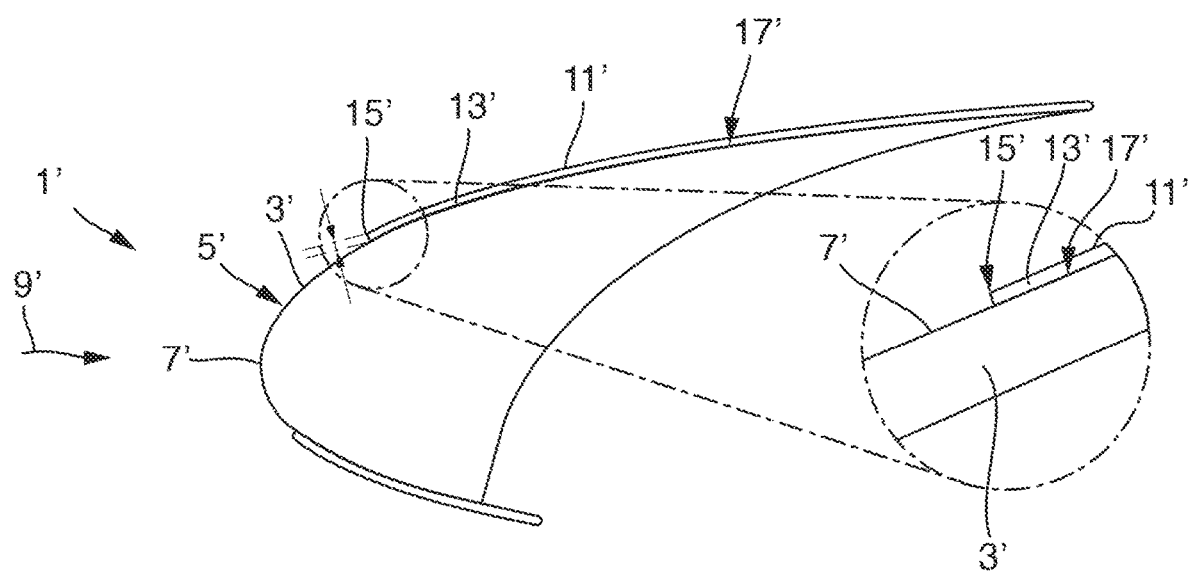
PRIOR ART    Fig. 3

AIRCRAFT STRUCTURE COMPONENT FOR LAMINAR FLOW

RELATED APPLICATION

This application incorporates by reference and claims priority to European patent application EP 22215336.3, filed Dec. 21, 2022.

FIELD OF TECHNOLOGY

The present invention relates to an aircraft structure component for laminar flow, such as a wing, a slat, a droop nose, a Krueger flap, a horizontal tail plane, a vertical tail plane, a wing tip, an engine nacelle, or parts of the same. Further aspects of the invention relate to an aircraft comprising such an aircraft structure component as well as a method for producing such an aircraft structure component.

BACKGROUND AND SUMMARY OF INVENTION

The aircraft structure component has an outer skin with an aerodynamic surface. The aerodynamic surface is referred to as the outer surface of the aircraft structure component that is in contact with the aerodynamic flow over the aircraft structure component.

The aerodynamic surface has a leading edge portion and a downstream portion. The leading edge portion is directed towards the incoming flow during flight of the associated aircraft, and is adapted for a laminar flow circulating along said leading edge portion. The downstream portion is located adjacently downstream from the leading edge portion with respect to the incoming flow. The downstream portion of the aerodynamic surface comprises a paint layer that is not present in the leading edge portion. As an alternative to the paint layer a foil layer might be provided in the downstream portion.

Although hereinafter it is referred to a paint layer only, the present specification also applies to a foil layer instead of a paint layer. The foil layer is attached to the downstream portion of the aerodynamic surface, such as by an adhesive. The leading edge portion can be entirely unpainted or can have some sort of paint or lacquer, while in any case the paint layer referred to in here that is present in the downstream portion does not extend over the leading edge portion. In such a way, a border line is formed between the leading edge portion of the aerodynamic surface and the downstream portion by the beginning paint layer. Further, the outer skin comprises an attachment surface to which the paint layer or the foil layer is attached.

Similar aircraft structure components are known from the prior art. It has been found advantages, in particular due to erosion of the paint in the leading edge portion, to apply the paint layer only in the downstream portion of the aerodynamic surface while omitting the paint layer in the leading edge portion upstream from the downstream portion. This is usually done by a foil or a cover covering the leading edge portion when the aerodynamic surface is painted, so that the paint layer is present only in the downstream portion but not in the leading edge portion after the cover is removed. However, this procedure leaves the border line in the form of a thickness jump at the aerodynamic surface between the unpainted leading edge portion and the painted downstream portion, such that the border line forms an edge line. Such a thickness jump increases the aerodynamic drag of the aircraft structure component, as it negatively influences the laminar flow present at the leading edge portion. Also, such a thickness jump may lead to erosion of the beginning paint layer in the downstream portion.

Accordingly, the present invention may be embodied to provide an aircraft structure component that allows for a reduced aerodynamic drag and reduced erosion of the paint layer.

The attachment surface of the outer skin may be lowered, such as that it extends on a lower level, relative to the leading edge portion of the aerodynamic surface, so that a level difference between the downstream portion of the aerodynamic surface formed by the paint layer or the foil layer attached to the lowered attachment surface and the leading edge portion of the aerodynamic surface is minimized, eliminated or at least reduced. By such a lowered attachment surface and the resulting minimized level difference between the downstream portion of the aerodynamic surface formed by the paint layer or foil layer attached to the lowered attachment surface on the one hand and the leading edge portion of the aerodynamic surface on the other hand, aerodynamic drag caused by the edge or thickness jump formed by the beginning paint layer along the border line can be reduced and erosion of the paint layer along the border line can be reduces, too.

According to an embodiment, the attachment surface of the outer skin is lowered relative to the leading edge portion of the aerodynamic surface essentially by the thickness of the paint layer or the foil layer attached to the attachment surface, so that the downstream portion of the aerodynamic surface formed by the paint layer or the foil layer attached to the lowered attachment surface is essentially flush with, e.g. extends on the same level as, the leading edge portion of the aerodynamic surface. In such a way, the level difference between the downstream portion of the aerodynamic surface formed by the paint layer or foil layer attached to the lowered attachment surface and the leading edge portion of the aerodynamic surface is eliminated, so that the aerodynamic drag and erosion of the paint layer along the border line can be minimized.

According to a further embodiment, the downstream portion of the aerodynamic surface comprises a first downstream portion part and a second downstream portion part provided on opposite sides from the leading edge portion, so that there is a first border line part between the leading edge portion and the first downstream portion part, and a second border line part between the leading edge portion and the second downstream portion part. In such a way, the invention can be applied to both sides of the leading edge portion and drag and erosion can be reduced on both sides of the leading edge portion, e.g., upper and lower side of e.g. a wing, slat or horizontal tail plain, or left and right side of e.g. a vertical tail plane.

According to an embodiment, the aircraft structure component is formed as a leading edge high lift component, such as a slat, a Krueger flap, or a droop nose. This relates to a very advantageous application of the invention.

According to an embodiment, the aircraft structure component is formed as a wing leading edge component. This relates to another very advantageous application of the invention.

According to an embodiment, the aircraft structure component is formed as a vertical tail plane leading edge component. This relates to another very advantageous application of the invention.

According to an embodiment, the aircraft structure component is formed as a horizontal tail plane leading edge component. This relates to another very advantageous application of the invention.

According to an embodiment, the aircraft structure component is formed as a wing tip component. This relates to another very advantageous application of the invention.

According to an embodiment, the aircraft structure component is formed as a nacelle leading edge component. This relates to another very advantageous application of the invention.

The present invention may be embodied as an aircraft comprising the aircraft structure component according to any of the embodiments described above. The features and effects described above in connection with the aircraft structure component apply vis-à-vis also with respect to the aircraft.

A further aspect of an embodiment of the present invention relates to a method for producing an aircraft structure component according to any of the embodiment described above. The method comprises the following steps: First, an aircraft structure component having an outer skin with an aerodynamic surface is provided. The aerodynamic surface has a leading edge portion and a downstream portion adjacently downstream from the leading edge portion. The outer skin in the area of the downstream portion comprises an attachment surface adapted for a paint layer or a foil layer to be attached to. Then, the attachment surface of the outer skin is lowered relative to the leading edge portion of the aerodynamic surface. Then, a paint layer or a foil layer is applied to the lowered attachment surface, wherein a level difference between the downstream portion of the aerodynamic surface formed by the paint layer or the foil layer attached to the lowered attachment surface and the leading edge portion of the aerodynamic surface may be minimized. This relates to a simple and efficient method to produce an aircraft structure component for laminar flow. The features and effects described above in connection with the aircraft structure component apply vis-à-vis also with respect to the method.

According to an embodiment, the attachment surface of the outer skin is lowered relative to the leading edge portion of the aerodynamic surface essentially by the thickness of the paint layer or the foil layer applied to the attachment surface, so that the downstream portion of the aerodynamic surface formed by the paint layer or the foil layer attached to the lowered attachment surface is essentially flush with, e.g. extends on the same level as, the leading edge portion of the aerodynamic surface. In such a way, the level difference between the downstream portion of the aerodynamic surface formed by the paint layer or foil layer attached to the lowered attachment surface and the leading edge portion of the aerodynamic surface is eliminated, so that the aerodynamic drag and erosion of the paint layer along the border line can be minimized.

According to an embodiment, lowering the attachment surface is carried out by ablation. In such a way, the attachment surface can be lowered efficiently without deforming the outer skin.

In particular, lowering the attachment surface may be carried out by chemical ablation. This allows a very efficient and precise ablation.

Alternatively, lowering the attachment surface may be carried out by machining. This also allows a very efficient and precise ablation.

SUMMARY OF DRAWINGS

Embodiments of the present invention are described hereinafter in more detail by means of a drawing. The drawing shows in FIG. 1 shows a top view of an aircraft including aircraft structure components according to the present invention in the form of slats, FIG. 2 is a schematic cross-sectional view of an aircraft structure component according to the invention as used in the aircraft shown in FIG. 1, and FIG. 3 is a schematic cross-sectional view of an aircraft structure component according to the prior art.

DETAILED DESCRIPTION

Figure 1:
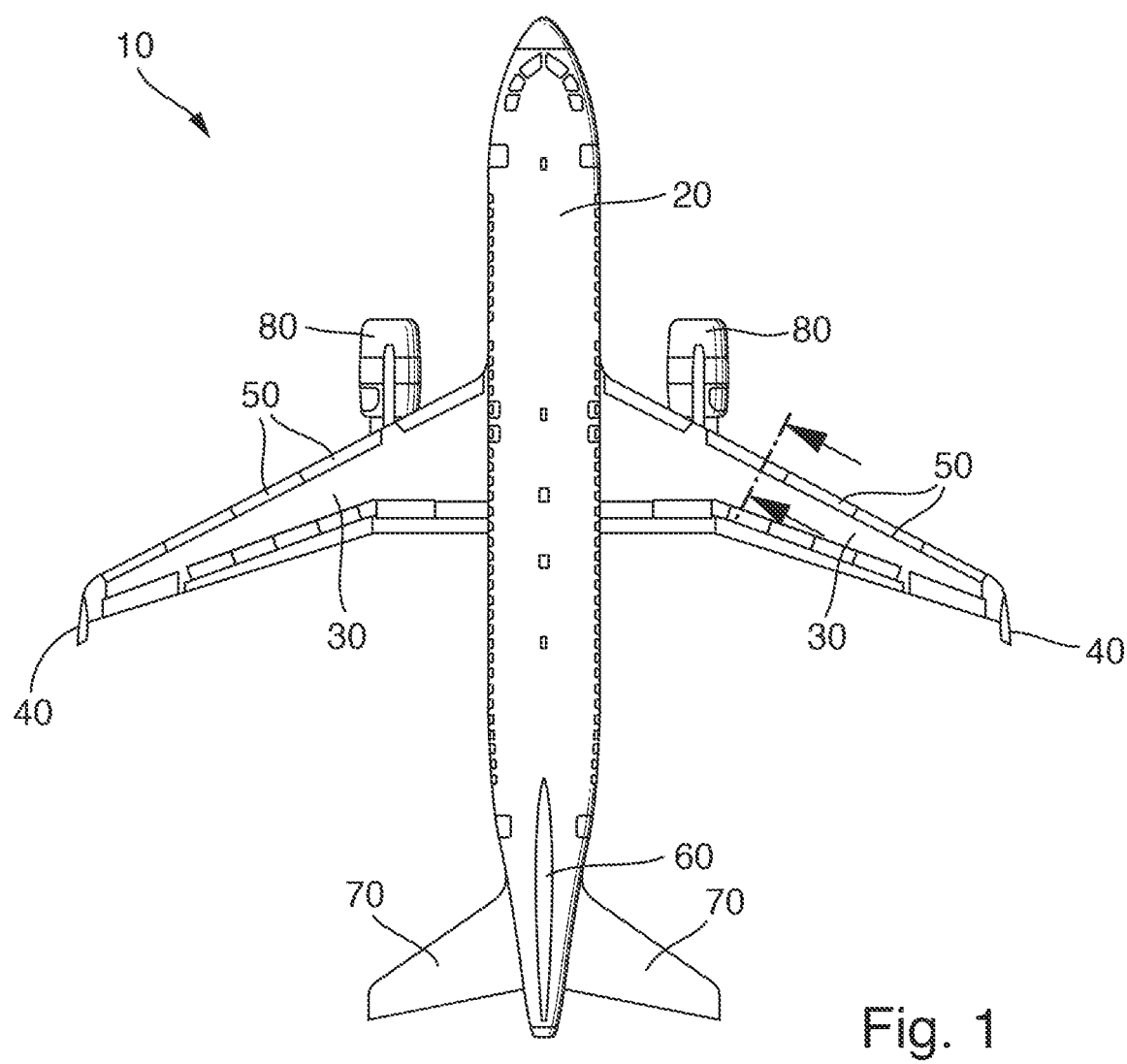

In FIG. 1 an embodiment of an aircraft 10 according to the present invention is shown. The aircraft 10 comprises a fuselage 20, wings 30 including wing tips 40 and leading edge high lift components in the form of slats 50, a vertical tail plane 60, a horizontal tail plane 70, and nacelles 80.

In FIG. 2 an embodiment of an aircraft structure component 1 for laminar flow according to the invention is shown, in the present embodiment a slat 50 as used in the aircraft 10 shown in FIG. 1. In FIG. 3 a corresponding prior art aircraft structure component 1' is shown.

The aircraft structure component 1 according to the invention (FIG. 2) and the aircraft structure component 1' according to the prior art (FIG. 3) both have an outer skin 3, 3' with an aerodynamic surface 5, 5' adapted to be in contact with an air flow. The aerodynamic surface 5, 5' has a leading edge portion 7, 7' that is directed towards the incoming flow 9, 9' of an associated aircraft 10, 10' during flight and that is, thus, adapted for a laminar flow. The aerodynamic surface 5, 5' further has a downstream portion 11, 11' adjacently downstream from the leading edge portion 7, 7' with respect to the incoming flow 9, 9'. The downstream portion 11, 11' of the aerodynamic surface 5, 5' comprises a paint layer 13, 13' that is not present in the unpainted leading edge portion 7, 7', so that a border line 15, 15' is present between the leading edge portion 7, 7' and the downstream portion 11, 11' by the beginning paint layer 13, 13', wherein the border line 15, 15' extends transverse the incoming flow 9, 9'. Further, the outer skin 3, 3' comprises an attachment surface 17, 17' to which the paint layer 13, 13' is attached.

In the aircraft structure component 1' according to the prior art as shown in FIG. 3, the attachment surface 17' forms a continuation of and thus extends at the same level of the leading edge portion 7' of the aerodynamic surface 5', so that the border line 15' with the beginning paint layer 13' is in the form of a thickness jump that might cause drag and erosion of the paint layer 13'.

In contrast thereto, in the aircraft structure component 1 according to the invention as shown in FIG. 2, the attachment surface 17 of the outer skin 3 is lowered such that it extends on a lower level, relative to the leading edge portion 7 of the aerodynamic surface 5, so that a level difference between the downstream portion 11 of the aerodynamic surface 5 formed by the paint layer 13 attached to the lowered attachment surface 17 and the leading edge portion 7 of the aerodynamic surface 5 is minimized. Specifically, the attachment surface 17 is lowered relative to the leading edge portion 7 of the aerodynamic surface 5 by the thickness of the paint layer 13 attached to the attachment surface 17, so that the downstream portion 11 of the aerodynamic surface 5 formed by the paint layer 13 attached to the lowered attachment surface 17 is flush with and extends on the same level as the leading edge portion 7 of the aerodynamic surface 5.

As also shown in FIG. 2, the downstream portion 11 of the aerodynamic surface 5 comprises a first downstream portion part 11a and a second downstream portion part 11b provided on opposite sides from the leading edge portion 7, so that there is a first border line part 15a between the leading edge portion 7 and the first downstream portion part 11a, and a second border line part 15b between the leading edge portion 7 and the second downstream portion part 11b.

The aircraft structure components 1 as shown in FIG. 2 can be produces in the following manner: First, an aircraft structure component 1 having an outer skin 3 with an aerodynamic surface 5 is provided, wherein the aerodynamic surface 5 has a leading edge portion 7 and a downstream portion 11 adjacently downstream from the leading edge portion 7 with respect to the incoming flow 9, and wherein the outer skin 3 in the area of the downstream portion 11 comprises an attachment surface 17 adapted for a paint layer 13 to be attached to. Subsequently, the attachment surface 17 of the outer skin 3 is lowered relative to the leading edge portion 7 of the aerodynamic surface 5. Finally, a paint layer 13 is applied to the lowered attachment surface 17, such that a level difference between the downstream portion 11 of the aerodynamic surface 5 formed by the paint layer 13 attached to the lowered attachment surface 17 and the leading edge portion 7 of the aerodynamic surface 5 is minimized. Specifically, the attachment surface 17 is lowered relative to the leading edge portion 7 of the aerodynamic surface 5 by the thickness of the paint layer 13 applied to the attachment surface 17, so that the downstream portion 11 of the aerodynamic surface 17 formed by the paint layer 13 attached to the lowered attachment surface 17 is flush with and extends on the same level as the leading edge portion 7 of the aerodynamic surface 5. Lowering of the attachment surface 17 in the present embodiment is carried out by chemical ablation.

By the aircraft structure component 1 according to the present invention including a lowered attachment surface 17 and the resulting minimized level difference between the downstream portion 11 of the aerodynamic surface 5 formed by the paint layer 13 attached to the lowered attachment surface 17 on the one hand and the leading edge portion 7 of the aerodynamic surface 5 on the other hand, aerodynamic drag caused by the edge or thickness jump formed by the beginning paint layer 13 along the border line 15 can be reduced and erosion of the paint layer 13 along the border line 15 can be also reduced.

An aircraft structure component (1) for laminar flow including an outer skin (3) having an aerodynamic surface (5), wherein the aerodynamic surface (5) has a leading edge portion (7) and a downstream portion (11) adjacently downstream from the leading edge portion (7), wherein the downstream portion (11) of the aerodynamic surface (5) comprises a paint layer (13) or a foil layer that is not present in the leading edge portion (7), so that a border line (15) is formed between the leading edge portion (7) and the downstream portion (11) by the beginning paint layer (13) or foil layer, and wherein the outer skin (3) comprises an attachment surface (17) to which the paint layer (13) or the foil layer is attached. The aircraft structure component may be configured to allow for a reduced aerodynamic drag and reduced erosion of the paint layer, is achieved in that the attachment surface (17) of the outer skin (3) is lowered relative to the leading edge portion (7) of the aerodynamic surface (5), so that a level difference between the downstream portion (11) of the aerodynamic surface (5) formed by the paint layer (13) or the foil layer attached to the lowered attachment surface (17) and the leading edge portion (7) of the aerodynamic surface (5) is minimized.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft structure component for laminar flow comprising:
   an outer skin having an aerodynamic surface, and the outer skin includes a leading edge portion, and a downstream portion adjacently downstream from the leading edge portion,
   wherein the downstream portion of the outer skin comprises a paint layer or a foil layer that is not present in the leading edge portion, so that a border line is formed between a downstream edge of the leading edge portion and an upstream edge of the paint layer or the foil layer,
   wherein the downstream portion of the outer skin comprises an attachment surface which is covered by the paint layer or the foil layer,
   wherein the attachment surface of the downstream portion of the outer skin is lower relative to the leading edge portion of the such that a level difference between the downstream portion of the aerodynamic surface formed by the paint layer or the foil layer attached to the lowered attachment surface and the leading edge portion of the aerodynamic surface is reduced, and
   wherein the upstream edge of the paint layer or the foil layer abuts a rear edge of the leading edge portion.

2. The aircraft structure component according to claim 1, wherein the downstream portion of the aerodynamic surface formed by the paint layer or the foil layer attached to the lowered attachment surface is flush with the leading edge portion of the aerodynamic surface.

3. The aircraft structure component according to claim 1, wherein the downstream portion of the aerodynamic surface comprises a first downstream portion part and a second downstream portion part provided on opposite sides from the leading edge portion.

4. The aircraft structure component according to claim 1, wherein the aircraft structure component is formed as a leading edge high lift component.

5. The aircraft structure component according to claim 3, wherein the aircraft structure component is formed as a wing leading edge component.

6. The aircraft structure component according claim 1, wherein the aircraft structure component is formed as a vertical tail plane leading edge component.

7. The aircraft structure component according to claim 1, wherein the aircraft structure component is formed as a horizontal tail plane leading edge component.

8. The aircraft structure component according to claim 1, wherein the aircraft structure component is a wing tip component.

9. The aircraft structure component according to claim 1, wherein the aircraft structure component is a nacelle leading edge component.

10. An aircraft comprising the aircraft structure component according to claim 1.

11. The aircraft structure component according to claim 1, wherein aerodynamic surface at a border of the paint layer or the foil layer and the leading edge portion has a substantially constant tangent.

12. A method for producing an aircraft structure component comprising:
   providing an outer skin of the aircraft component, wherein the outer skin has an aerodynamic surface, wherein the aerodynamic surface has a leading edge portion and a downstream portion adjacently downstream from the leading edge portion, and wherein the outer skin includes an attachment surface below the downstream portion and adapted to receive a paint layer or a foil layer;
   lowering the attachment surface of the outer skin inward relative to the leading edge portion of the aerodynamic surface, and
   after the lowering, applying a paint layer or a foil layer to the attachment surface such that an upstream edge of the paint layer or the foil layer abuts a downstream edge of the leading edge portion,
   wherein the paint layer or foil layer forms a portion of the aerodynamic surface that is substantially aligned along a direction of airflow over the aerodynamic surface with the leading edge portion.

13. The method according to claim 12, wherein the attachment surface of the outer skin is lowered relative to the leading edge portion of the aerodynamic surface by the thickness of the paint layer or the foil layer applied to the attachment surface, so that the downstream portion of the aerodynamic surface formed by the paint layer or the foil layer attached to the lowered attachment surface is flush with the leading edge portion of the aerodynamic surface.

14. The method according to claim 12, wherein the lowering of the attachment surface is performed by ablation of the downstream portion.

15. The method according to claim 14, wherein the lowering of the attachment surface is performed by chemical ablation of the downstream portion.

16. The method according to claim 12, wherein the lowering of the attachment surface is performed by machining the downstream portion.

17. The method of claim 12, wherein the aerodynamic surface has a substantially constant tangent where the upstream edge of the of the paint layer or the foil layer abuts the downstream edge of the leading edge portion.

18. An aerodynamic outer skin of an aircraft structure comprising:
   a leading edge portion of the outer skin,
   a downstream portion of the outer skin adjacently and downstream from the leading edge portion along a flow direction of laminar flow over the aerodynamic outer skin,
   an attachment surface having an upstream edge defining a border line adjacent the leading edge portion,
   a step formed along the border line at which downstream portion is stepped down a height from the leading edge portion, and
   a paint layer or a foil layer on the attachment surface, wherein an upstream edge of the paint layer or the foil layer is aligned with the border line adjacent a downstream edge of the leading edge portion such that the upstream edge abuts the downstream edge,
   wherein a thickness of the paint layer or the foil layer adjacent the border line is substantially the height of the step.

19. The aerodynamic outer skin according to claim 18, wherein the leading edge portion is flush with the paint layer or the foil layer at the border line such that the aerodynamic outer skin is relatively across the border line.

20. The aerodynamic skin of claim 18, wherein an outer surface of the paint layer or the foil layer and an outer surface of the leading edge portion form an aerodynamic surface having a substantially constant tangent at the border line.

* * * * *